Jan. 31, 1967  W. G. REIMANN  3,302,066
STANDARDIZED WELDED WIRE MODULES
Filed Nov. 6, 1961  7 Sheets-Sheet 1

INVENTOR:
William G. Reimann

By Alan C. Rose
Attorney

INVENTOR:
William G. Reimann

By Alan C. Rose
Attorney

Jan. 31, 1967  W. G. REIMANN  3,302,066
STANDARDIZED WELDED WIRE MODULES
Filed Nov. 6, 1961  7 Sheets-Sheet 4

INVENTOR.
William G. Reimann
By Alan C. Rose
Attorney

Jan. 31, 1967  W. G. REIMANN  3,302,066
STANDARDIZED WELDED WIRE MODULES
Filed Nov. 6, 1961  7 Sheets-Sheet 5

| | \multicolumn{16}{c|}{Vertical Riser Wire Identification} |
|---|---|---|---|---|---|---|---|---|---|---|---|---|---|---|---|---|
| | Q3-C | Q3-B | | Q3-B | Q1-E | | SIG GRD | | Q2-E | Q2-B | | | | Q4-B | | Q4-C | GRD |
| Layer 4-4 | 1 | 3 | | 5 | 7 | | 11 | | 2 | 4 | | | | 10 | | 12 | 14 |
| Layer 6-6 | 1 | 3 | | 5 | 7 | 9 | 11 | 13 | 2 | 4 | 6 | | | 10 | | 12 | 14 |
| Layer 7-7 | 1 | 3 | | 5 | 7 | 9 | 11 | 13 | 2 | 4 | 6 | | 8 | 10 | | 12 | 14 |
| Layer 8-8 | 1 | 3 | | 5 | 7 | 9 | 11 | 13 | 2 | 4 | 6 | | 8 | 10 | | 12 | 14 |
| Layer 9-9 | 1 | | 3 | 5 | 7 | 9 | 11 | 13 | 2 | 4 | | 6 | 8 | 10 | | 12 | 14 |
| Layer 10-10 | 1 | | 3 | | | 7 | 9 | 11 | 13 | | | 6 | 8 | | 10 | 12 | 14 |
| Layer 11-11 | | | 3 | | | 7 | 9 | 11 | 13 | 2 | | 6 | 8 | | 10 | | 14 |
| Input-Output | | | 3 | | | 7 | 9 | 11 | 13 | 2 | | 6 | 8 | | 10 | | 14 |
| Extension | | | WO | | | HD1 | +12v | SIG GRD | -12v | HD2 | | W1 | GRD | | HD0 | | GRD |

INVENTOR:
William G. Reimann

By Alan C. Rose
Attorney

Jan. 31, 1967　　W. G. REIMANN　　3,302,066
STANDARDIZED WELDED WIRE MODULES
Filed Nov. 6, 1961　　7 Sheets-Sheet 6

INVENTOR:
William G. Reimann

By Alan C. Rose
Attorney

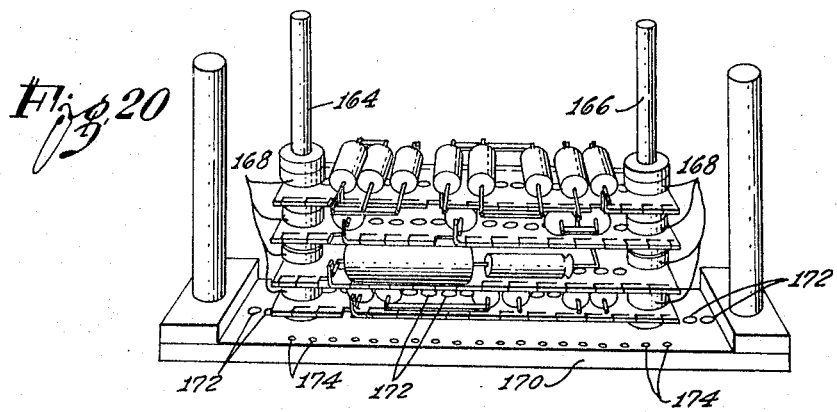
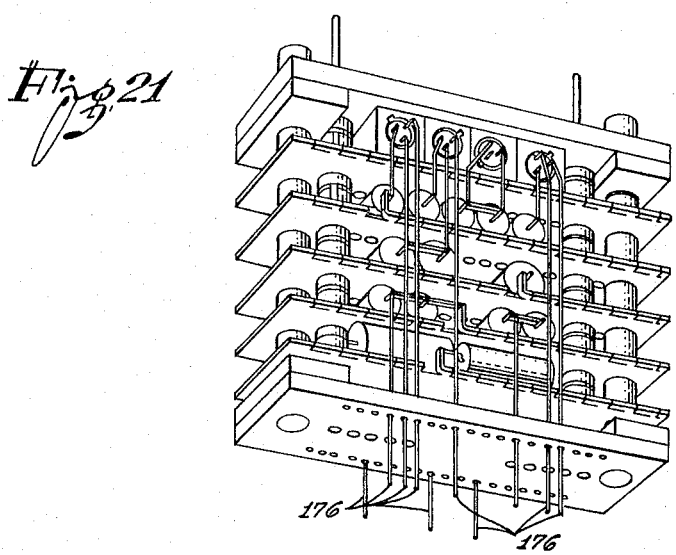
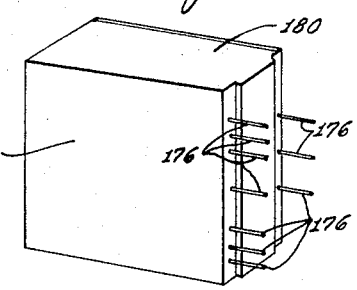
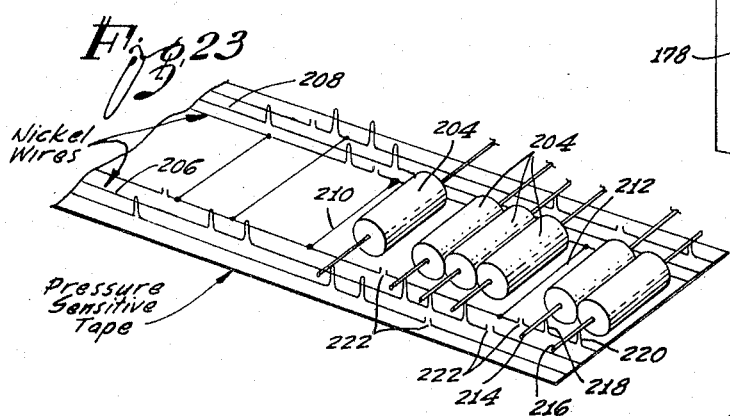

United States Patent Office 3,302,066
Patented Jan. 31, 1967

3,302,066
STANDARDIZED WELDED WIRE MODULES
William G. Reimann, Los Angeles, Calif., assignor to Litton Systems, Inc., Beverly Hills, Calif.
Filed Nov. 6, 1961, Ser. No. 150,546
15 Claims. (Cl. 317—101)

This invention relates to three-dimensional electronic circuit packages using welded wire connections.

In the field of electronic circuitry, much progress has recently been made in increasing the density of component packaging. These techniques in which electronic components are stacked side-by-side are frequently referred to as "cordwood" packaging arrangements, as the components are arranged much like stacks of wood. In these high density arrangements, the problem of interconnecting the components to form circuits is most challenging. In the past, the leads have been interconnected principally by either point-to-point wiring or by printed circuit boards.

Point-to-point wiring techniques for cordwood packaging arrangements has the advantage of providing about the densest component packaging which is possible. However, point-to-point modules are difficult and expensive to construct. Their unique compactness necessitates skill and extreme care in assembly, in the custom routing of the nickel ribbon which is usually employed for interconnections and in selecting the order and scheduling of the welds. Furthermore, the high cost of labor required for the point-to-point interconnections makes these modules prohibitively expensive for most applications.

Other arrangements have provided printed circuit boards or their equivalent in weldable nickel to interconnect the components. When circuit boards are provided, however, each circuit must be planned far ahead of time and the individual circuit boards must be ordered and fabricated to suit the individual circuit.

An important object of the present invention is to reduce the cost of welded wire modules, while maintaining relatively high component densities.

An additional object of the invention is to provide a standardized wiring format which has design flexibility in the interconnection of components, and yet which does not require a prolonged period of time between the design of the circuit and the completed prototype.

Collateral objects of the invention include reducing the level of skill which is required in the assembly of welded wire modules and reducing the lead time required between initial design and production.

In accordance with the present invention, the foregoing objects are achieved through the use of a three-dimensional wiring scheme for a "cordwood" type electronic module, in which connections are made by leads which extend in two mutually orthogonal directions perpendicular to the axes of the resistors and other electronic components which form the bulk of the modules. In addition, the modules are built up of layers in which rows of electrical components are mounted upon conductive bus strips. Electrical interconnections are made between the components by connecting them to the bus strips or by connections through the arrays of mutually orthogonal wires at both ends of the components.

Thus, the module in accordance with the present invention is made up of successive layers of components which may be considered to lie in horizontal planes, for purposes of reference. The bus strips associated with successive layers are employed for common connections between the components of a layer. Thus, in the case of active modules such as multivibrators or amplifiers, the ladders represent a fixed potential such as ground or another voltage level. In the case of diode logic circuitry, the bus strips may be the common output connection from a serise of diodes forming an AND gate.

In general, when an electrical circuit is transformed into modular form, the common connection to two or three or more components may be selected as the point where the conductive bus strips will be located in the circuit. Thus, for active modules, the bus strips carry voltages which are usually connected to several components; similarly, in logic circuits the bus strips are connected to two or more of the diodes in a gate.

Other interconnections between the components in the module are made by wires extending parallel to the horizontal plane of the ladders and perpendicular to the axes of the components. These cross-connections may be made in two successive planes, one of which is very close to the ends of the components and the other being spaced outwardly from the components by a small distance, which may, for example, be about one-eighth inch. External connections to the module are made through "riser wires" which extend perpendicular to the plane of the ladders and the successive layers of the components. The riser wires typically bring reference voltage levels to the module package and provide signal interconnection leads between modules. In addition to connecting the module to the "outside world," the riser wires serve to interconnect the electronic components in successive layers within the module.

Unlike point-to-point connections, the ladders, the cross-connections, and the riser wires provide a fixed and orderly reference grid of wires which serve to interconnect in a regular manner all of the components of the module. Furthermore, subassemblies of components with the respective bus strips may readily be formed. These subassemblies or layers include a bus strip and a series of components usually of approximately the same diameter stacked closely together and secured to the ladder. The components are normally secured physically to the bus strip, either by a welded electrical connection, or, in the case of a component which is not to be electrically connected to the bus strip, by cement or glue. Necessary interconnections between the electrical components in the particular layer of the module are then completed, usually by leads extending parallel to the bus strip. Subsequently, the successive layers, each with its associated bus strip, are stacked one on top of the other, and the vertical riser wires are positioned and welded in place. These riser wires then interconnect the various layers, both electrically and physically. As the last step in completing the electrical circuit, the riser wires are then clipped to eliminate undesired cross-connections between layers.

The bus strips associated with each layer are normally formed of nickel to facilitate welding, and may take the form of stampings, for example. The bus strip may also be formed of a pair of wires with regular cross-connections to provide a structure which presents the appearance of a ladder. Insulating strips may also be associated with the conductive wires to form part of the bus strip.

To increase the density of packing, particularly in logic modules, two or more layers may be combined to form a sandwich construction including an upper and lower bus strip and interfitting components mounted on the two strips. The technique is possible, of course, only when corresponding layer positions of the first and second layers are vacant and occupied by electrical components, respectively.

In accordance with another feature of this invention, vertically extending riser wires occupying opposite positions at the two ends of a given standardized component space may be energized by the opposed outputs from a multivibrator. In the case of such logic modules, each gate arrangement will normally occupy a logic layer. Furthermore, only one output from a particular flip-flop or multivibrator is characteristically employed in each logic gate. Under these conditions, there will be no conflicting requirements for a given component position in any one layer as the diode required in the particular component position will be connected to but one of the two riser wires which bracket the component position of the layer in question. Other pairs of signals which are similar to the output signals from a multivibrator, may also be connected to opposite riser wires to yield the same advantages.

Important advantages of the present modular constructions are derived from the use of the layer subassemblies. This technique permits partial construction without all of the parts being present. Specialization is practical with one employee assembling a number of the small subcomponents. Less skilled help may be employed and the module cost is greatly reduced, in view of the elimination of three-dimensional assembly work required in point-to-point assemblies. All of the components which are employed are standard so that no special circuit boards or the like are required and the necessity of designing and procuring custom mechanical components is eliminated. It is therefore possible to go from a schematic diagram to a prototype module in hours. This is in contrast to the lead time of days or weeks which is required when special circuit boards or ribbon routing artwork must be prepared, as in the case of point-to-point wiring.

Another advantage arises from the use of a regular pattern of bus strips and cross-connections. When this construction is employed, the modules are thermally predictable, and the weight and thermal qualities of the potting material may be tailored precisely to the heat dissipation requirements of the modules.

Other advantages include reductions in design, drafting and tooling costs. Furthermore, the modules have the usual advantages of the welded construction including reliable joints, a lack of thermal damage, and controlled reproducibility of connections. The regular pattern of the connections also makes the assembly procedures amenable to automation.

In accordance with another feature of the invention, the length of the layers included in any particular module may be readily adjusted. This permits great flexibility through tailoring the volume of the module to fit the complexity of the circuit. Similarly, the length of the layers and thus the volume of the module may be increased to accommodate additional circuits, by repeating a component pattern on the bus strips. This is in sharp contrast with the rigid limitations imposed by circuit boards, where an entire card, capable of handling several transistors and associated components, must often be allocated to a single transistor.

Various factors contribute to the ease in varying the length of the layers and the volume of individual modules. First, the bus strips may easily be cut to any desired length, and assembly procedures remain substantially unchanged. In active modules the fact that the bus strips never carry signals facilitates the use of additional circuits in a single module. Therefore, the only extra leads are the riser wires and the interconnection leads at the ends of the components, and space for these wires is automatically provided by the additional length of the layers.

The novel features which are believed to be characteristic of the invention, both as to its organization and method of construction and operation, together with further objects, features and advantages thereof, will be better understood from the following description considered in conjunction with the accompanying drawing in which illustrative embodiments of the invention are disclosed, by way of example. It is to be expressly understood, however, that the drawing is for the purpose of illustration and description onlly and does not constitute a limitation of the invention.

In the drawing:

FIG. 20 shows a partially assembled module and the jigging arrangements which are used in its construction;

FIG. 21 shows a module with the completed interconnection array before encapsulation, in accordance with the present invention;

FIG. 22 shows the completed welded wire module encapsulated in plastic and enclosed in a metal channel member; and FIG. 23 shows an alternative construction for the layers of components.

Figure 1:
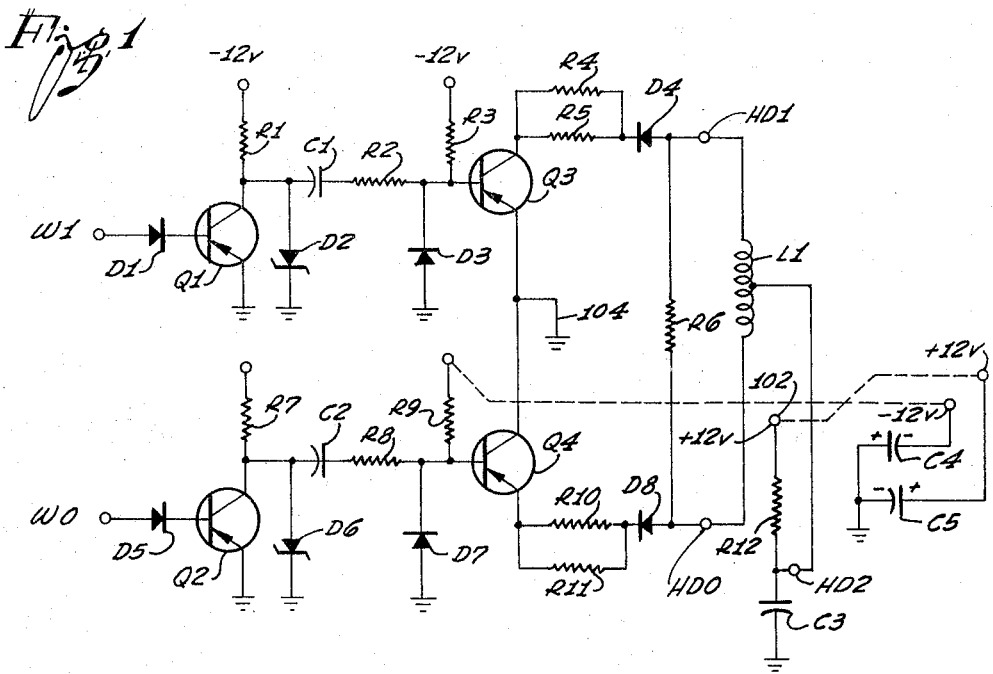
FIG. 1 is a circuit diagram of a typical active data processing circuit.
Figure 2:
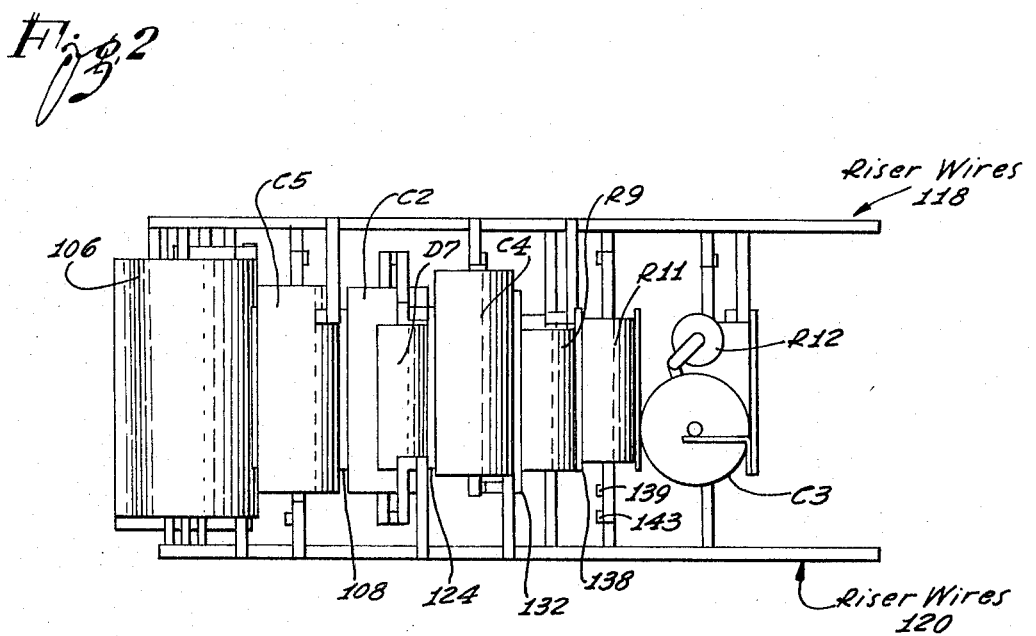
FIG. 2 is a side view of a welded wire module in accordance with the invention which implements the active circuit of FIG. 1.

Referring more particularly to the drawings, FIG. 1 is a driving circuit for a magnetic drum writing winding. The circuit of FIG. 1 is included for comparison with the corresponding welded wire module which is shown in detail in FIGS. 2 through 11. In this connection, it may be noted that the writing coil L1 is not included in the module but is physically associated with the drum.

The nature of the specific circuit of FIG. 1 will now be considered briefly. The circuit of FIG. 1 supplies pulses of selected polarity through the coil L1 to selectively magnetize the associated drum. This is accomplished by directing current from the 12-volt source connected to the terminal 102 either through the upper or lower portion of the center tapped coil L1. The current from the terminal 102 is selectively directed through one of the portions of coil L1 by turning either transistor Q3 to transistor Q4 on, and thus providing a low impedance path from terminal 102 to the ground lead 104. The buffer transistors Q1 and Q2 are provided to drive the switching transistors Q3 and Q4, respectively.

Now that the basic circuit components have been considered, some of the details will also be noted. Initially, there are a number of resistors connected to the 12-volt power source which provide proper operating potentials to the transistors. These include resistors R1, R3, R7 and R9, for example. The zener diodes D2 and D6 are provided to clamp the voltage level at the emitters of transistors Q1 and Q2 when these transistors are deenergized. They may, for example, clamp them at a −3 volt level.

The capacitor C3 provides much of the energy for the pulses through writing coil L1. It is, of course, charged from the 12-volt source between pulses. The load circuit for the writing coil L1 includes current limiting resistors R4 and R5 for one polarity of writing pulses, and resistors R10 and R11 for the other polarity. Two resistors are placed in parallel in each case in order to obtain the proper current level, and to split the heat dissipation between two resistors in each circuit.

The resistor R6 serves to dissipate the energy in the magnetic field caused by current flowing through the coil L1, when the transistor Q3 or Q4 is turned off. In the absence of resistor R6, the energy might damage one of the transistors.

The diodes D3 and D7 serve to protect the base-to-emitter junction of transistors Q3 and Q4, respectively. In the absence of diodes D3 and D7, the base potential could drop to the −12 volt level of the current supply applied across resistor R9. Under these circumstances, the base-to-emitter circuit could be damaged as they are only designed to withstand three volts in the reverse direction. The diodes D1 and D5 perform similar protective functions for transistors Q1 and Q2, respectively. However, they are placed in series with the base-to-emitter junction and avoid possible breakdown by this location.

The circuit of FIG. 1 was picked as a typical active circuit for illustrating the present welded wire module technique. The implementation of this circuit in terms of its physical construction will now be considered in connection with subsequent figures of the drawing.

Figure 3:
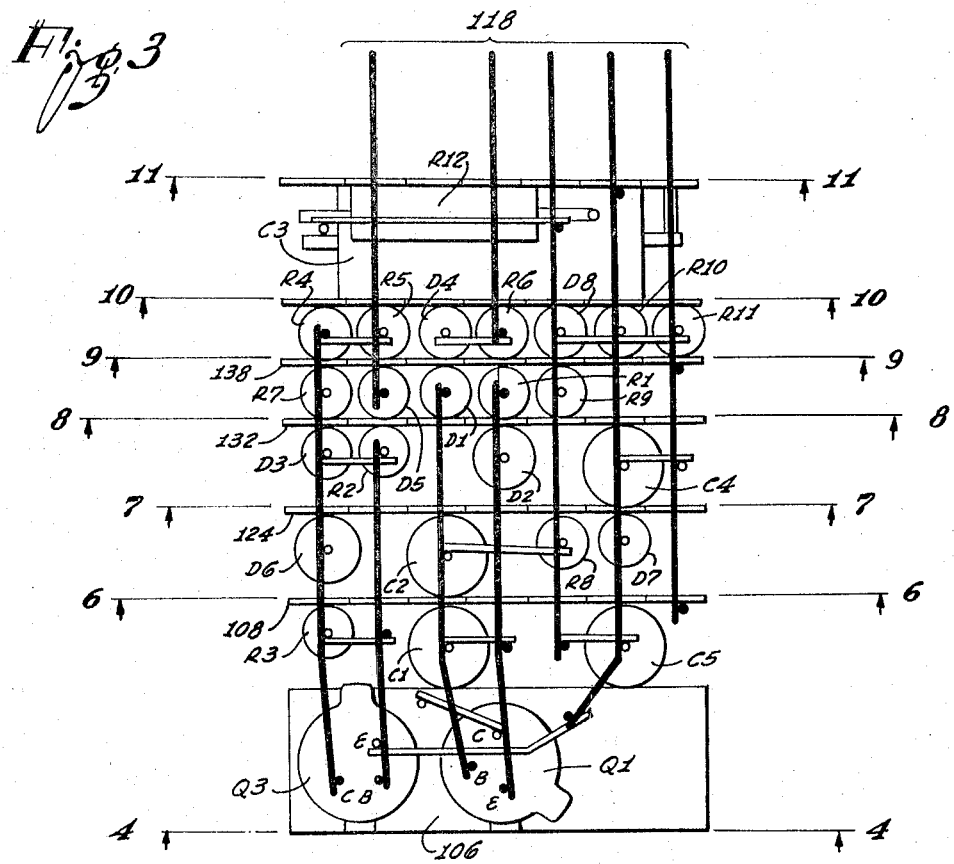
FIGS. 3 and 5 are views showing interconnection arrays on opposite sides of the welded wire module of FIG. 2.
Figure 4:
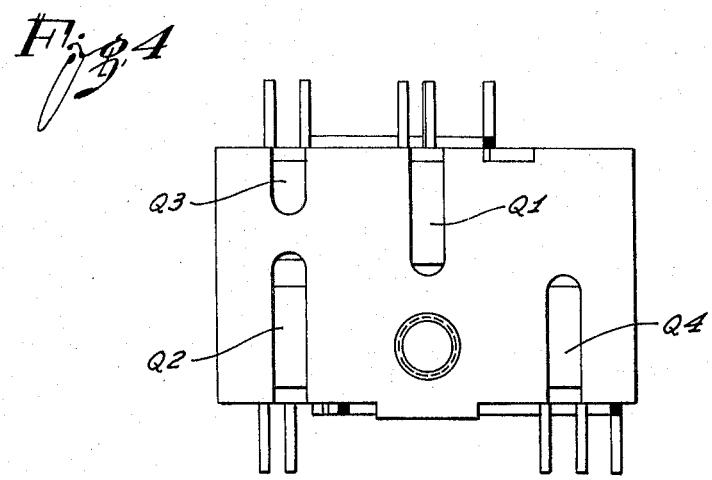
FIGS. 4 and 6 through 11 are cross-sectional views showing successive modular layers of electronic components taken along the indicated section lines of FIG. 3.
Figure 5:
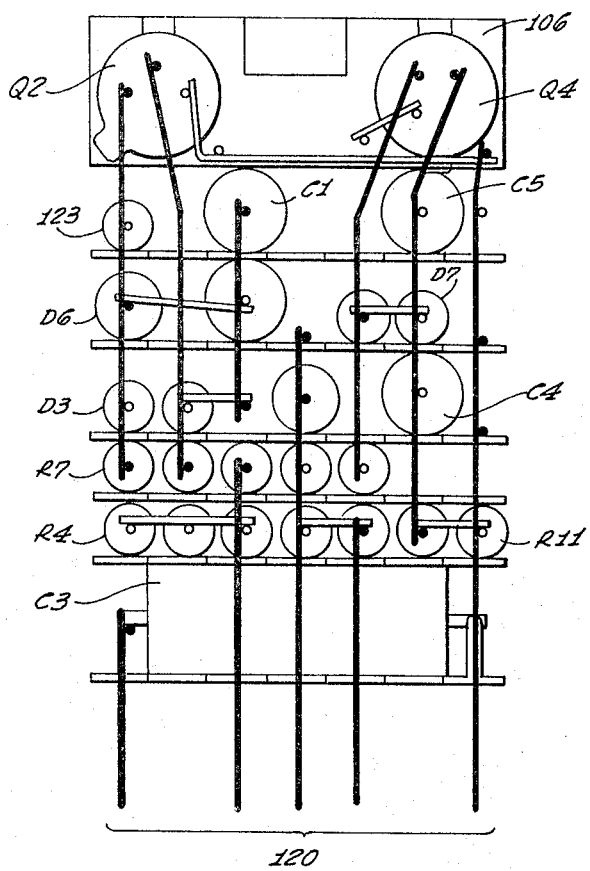

The circuit of FIG. 1, with the exception of the coil L1, appears in the module shown in FIGS. 2 through 11 of the drawings. The general outline of module may be observed from the two mechanical drawing views of FIGS. 2 and 3. The view of FIG. 5 is taken from the opposite side of the module than that of FIG. 3. The successive sections 4—4 and 6—6 through 11—11 are shown individually in FIGS. 4 and 6 through 11, respectively.

With particular reference to FIGS. 2 through 5, a special molded block 106 includes the four transistors Q2 through Q4. As clearly shown in FIGS. 3, 4 and 5, two transistors Q1 and Q3, have their three electrodes extending from one end of the molded block 106 and the other two transistors, Q2 and Q4, have their terminals extending from the opposite end of the block. As the transistors Q2 and Q3 are much shorter than the width of the block 106, these two transistors are located back-to-back at one end of the block 106 as indicated in FIG. 4.

Figure 6:
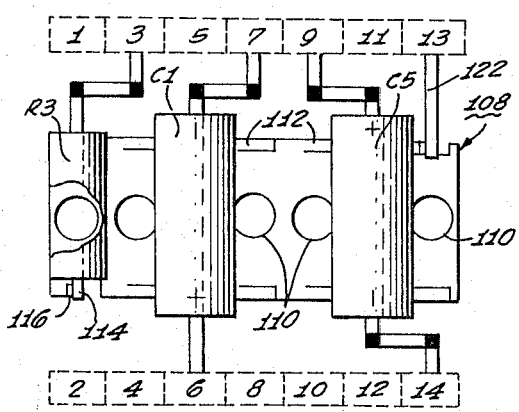

The next layer adjacent and above the transistor block 106 may be seen in FIG. 6 which is taken as indicated by lines 6—6 of FIG. 3. This first layer includes the resistor R3 and two capacitors C1 and C5. They are mounted on the perforated nickel bus strip 108. The nickel strip 108 has a series of holes 110 along its length. At each edge, the nickel strip 108 carries a number of preformed tabs 112 which may be readily bent up perpendicular to the plane of the strip 108 for securing to electrical components or leads.

The strip 108 is made of nickel in order to facilitate the numerous welding operations which are involved. Each of the components in the layer shown in FIG. 6, and normally in all layers associated with a nickel strip, are secured to a strip. This may be accomplished either by electrical connections or by a suitable cement. Thus, for example, the components R3, C1 and C5 are glued or cemented to the strip 108. In addition, resistor R3 has its lower lead 114 secured to a tab 116 which has been bent up from the plane of the strip 108. As noted above, the nickel strip 108 has a series of tabs 112 prepared for bending and welding to electrical components. The interconnection of lead 114 and tab 116 typifies this operation. In general, the nickel strip is employed to carry voltage levels or signals which are common to a number of the components in the particular layer. In the present case, for example, the nickel strip is maintained at the −12 volt transistor supply voltage.

Figures 12, 13:
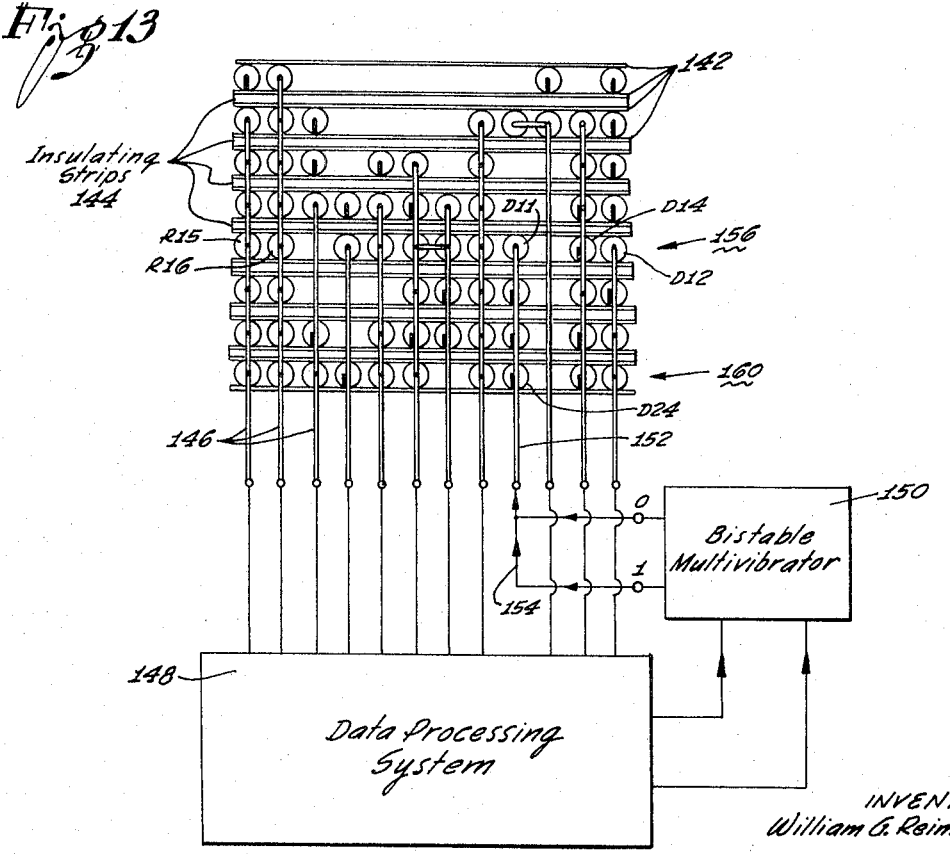
FIG. 12 is a table indicating the electrical connections for certain identified wires in the interconnection arrays of FIG. 3.
FIG. 13 is a combined block circuit diagram and schematic view of a logic type welded wire module, in accordance with the invention.

In FIG. 6 there are a series of numbered rectangles shown above and below the layer. These numbered rectangles refer to positions for the "riser" wires indicated generally at 118 and 120 in FIGS. 3 and 5. As may be observed in these figures, there are seven riser wire positions on each side of the module. However, only selected wires are present at various points along the length of the module. In FIG. 6, however, seven riser wire positions appear on either side of the particular layer which is shown. FIG. 12 is a diagram indicating the connections of the various riser wires in each layer or subassembly. Thus, for example, with reference to the row designated "layer 6—6" in FIG. 12, it may be seen that the riser wire column 13 appears about half-way across FIG. 12. At the bottom of the table of FIG. 12, it may be seen that riser wire 13 is connected to the −12 volt transistor supply potential. With reference to FIG. 6, it may be seen that the nickel strip 108 is connected by lead 122 to riser wire 13. It has been noted previously that one terminal 114 of resistor R3 is connected to nickel strip 108 by the tab 116. This connection may be verified by reference to the drawing of FIG. 1 in which the resistor R3 is shown connected between −12 volts and the base electrode of transistor Q3.

Figure 7:
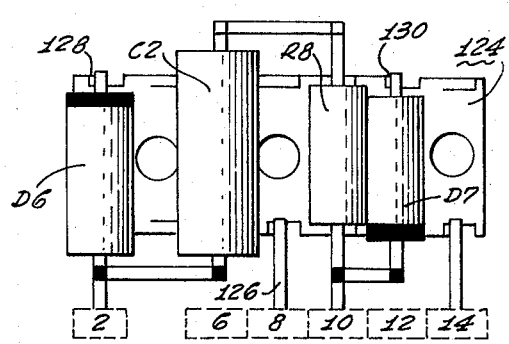

FIG. 7 is taken along the lines 7—7 of FIG. 3. In addition to the components, including diodes D6 and D7, resistor R8 and capacitor C2, the layer of FIG. 7 includes the nickel strip 124. The nickel strip 124 is connected by lead 126 to riser wire position 8. As shown in FIG. 12, riser wire position 8 represents ground potential. To verify this analysis, it may be noted that diodes D6 and D7 are connected by tabs 128 and 130, respectively, to the grounded nickel strip 124. This may be confirmed by reference to FIG. 1 in which diode D6 is shown connected from ground to the emitter of transistor Q2, and in which diode D7 is shown connected from ground to the base of transistor Q4.

Figure 8:
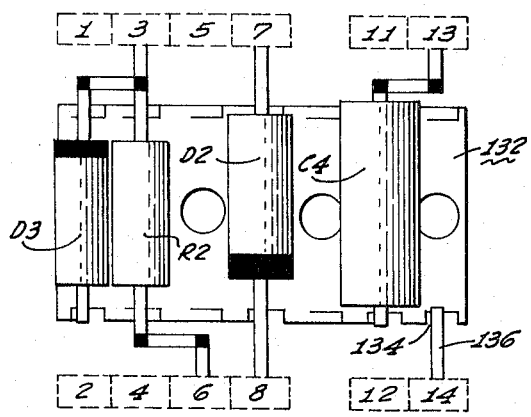

The layer subassembly of FIG. 8 is taken as indicated by lines 8—8 of FIG. 3. This layer includes the two diodes D2 and D3, resistor R2, and capacitor C4. The nickel strip 132 is connected to riser wire position 14 by the tab 134 and lead 136. As noted previously by reference to the table of FIG. 12, riser wire position 14 represents ground along the entire length of the module. Nickel strip 132 is therefore grounded. It may be noted that one terminal of diode D3 and capacitor C4 are shown in FIG. 8 as being grounded to the nickel strip 132. As seen in FIG. 1, D3 is indeed connected between ground and the base of transistor Q3. Similarly, filtering capacitor C4 is shown in FIG. 1 as connected between ground and the −12 volt source. In this regard, it may be noted that the filtering capacitors are spread out in individual modules to cut down on cross-coupling, instead of the conventional practice of including a larger capacitor in the power supply.

Figure 9:
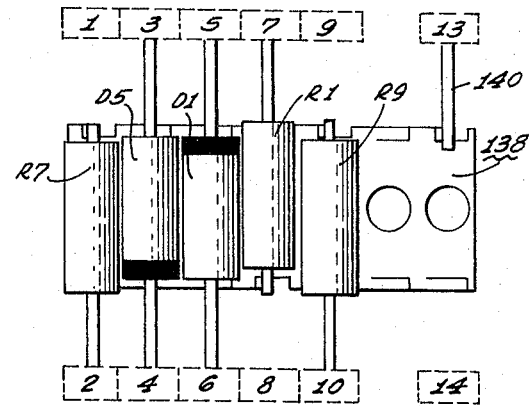

The layer of FIG. 9 includes diodes D1 and D5 and resistors R1, R7, and R9. The nickel strip 138 is connected by lead 140 to riser wire position 13 and thus to the −12 volt level. The physical connections of all three resistors R1, R7 and R9 to the −12 volt nickel strip 138 may be verified from the electrical connections shown in the circuit diagram of FIG. 1.

Figure 10:
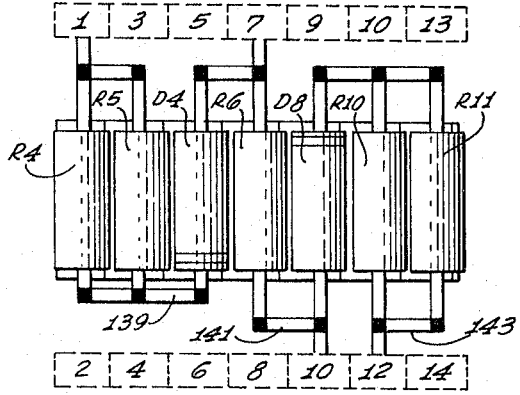

FIG. 10 is taken as indicated by lines 10—10 of FIG. 3. The layer of FIG. 10 includes two diodes D4 and D8, in addition to five resistors R4, R5, R6, R10 and R11. The connections of layer 10 show resistors R4 and R5 connected to one terminal of diode D4. As indicated in the circuit diagram of FIG. 1, these elements are so connected in the collector circuit of transistor Q3. The table of FIG. 12 through cross-reference to the transistor layer designated 4—4, indicates that the collector electrode of transistor Q3 is connected to riser wire No. 1. As seen in FIG. 10, resistors R4 and R5 have two of their terminals connected together to riser wire 1, thus confirming the table of FIG. 12 and the circuit diagram of FIG. 1. Diode D8 and resistors R10 and R11 are also connected to a common point, and the two other terminals of resistors R10 and R11 are connected to riser wire 12. As indicated in the table of FIG. 12, riser wire 12 is connected to the collector of transistor Q4, thus confirming the circuit of FIG. 1.

As mentioned above, the interconnection arrays on either side of the module may be located in two or three planes, successively spaced outward from the ends of the components which are stacked up in the module. The connections in these arrays include the riser wires shown at 118 and 120 in FIGS. 2 and 5 which are normally spaced farthest out from the components. These riser wires are oriented perpendicular to the planes of the bus strips which separate the layers of the module. Inside the plane of the riser wires, closer to the components, are the leads which interconnect components within the layers. These leads extend in a direction parallel with the bus strips and perpendicular to the axis of the components. In the active module shown in FIGS. 2 through 11 of the drawing, most of these connections may be made in a single plane. More generally, however, two planes are required, with one set of interconnection wires parallel to the other but spaced at a slightly different distance from the ends of the components. In FIG. 10 such an arrangement is shown in which the interconnection lead 139 is spaced close to the ends of the resistors R4 and R5 and the diode D4 which it interconnects. The wires 141 and 143 are located in a plane which is spaced outwardly from the plane of the wire 139. Through experience it has been found that wires located in three spaced planes located outwardly from the ends of the components are sufficient to interconnect any normal modular circuit array, and that with some simple modules the leads may be in two spaced planes.

Figure 11:
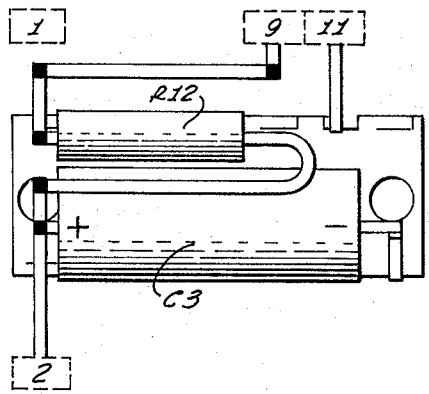

FIG. 11 is the final cross-sectional view taken as indicated by lines 11—11 of FIG. 3. It includes two components, resistor R12 and capacitor C3. The large size of capacitor C3, which provides the power for the writing pulses, requires that it be oriented crosswise with respect to the other module elements. Resistor R12 which is associated with capacitor C3, as shown in the circuit diagram of FIG. 1, forms the only additional component in the layer of FIG. 11. These two components are clearly physically connected in the manner indicated in the circuit diagram.

A brief additional explanation of the designations employed in the table of FIG. 12 is appropriate. First, with reference to layer 4—4, the transistors are designated by their numbers and a single letter E, B or C to indicate the emitter, base, or collector electrodes, respectively. Thus, the designation Q3–B represents the base electrode of transistor Q3. The input-output extension portions of the riser wire leads are designated at the bottom of the table of FIG. 12. These are the interconnections of the module with other portions of the system, and these riser wire leads are the only connections extending beyond the module. The positive and negative "–12" volt designations are obvious, and the meaning of the ground and the signal ground designations is also apparent. The designations W–1 and W–0 stand for "write 1" and "write 0," respectively, and refer to the input signals to transistors Q1 and Q2, respectively. "Write 1" and "write 0" refer to writing a binary signal, either a "1" or a "0," by applying positive or negative pulses to the magnetic drum, through selective energization of coil L1. The three output terminals from the module which are to be connected to the coil L1 of the write head, are the HD–0, the HD–1, and the HD–2 terminals, with the HD designation standing for "head." These signals appear on riser wires 10, 7 and 2, respectively.

As mentioned previously, FIGS. 3 and 5 represent views of the module from opposite ends. The components which are readily visible in these figures carry reference designations corresponding to those used in other figures of the drawing.

The module described in the foregoing detailed description may be designated an "active" module as contrasted with the "logic" module which will now be more briefly described.

The logic modules differ from the active modules in certain minor respects, but follow the same overall pattern in which ladders or bus strips, and additional cross-connections and riser wires are employed. As in the case of the active modules, the interconnections in the logic modules follow a regular pattern in accordance with rectangular coordinates. This regularity of interconnections permits step-by-step connections of the components within the layer subassemblies and subsequent systematic and regular interconnection of the layers by riser wires.

In both the active and the logic modules, the ladders are employed for the electrical connection which is common to the greatest number of components on the particular layer. In the case of active modules, this common voltage is normally either the transistor supply voltage or ground. In the case of diode logic circuits such as will be considered in the following description, the common signal output from a set of diodes forming an AND or an OR gate normally appears on the associated nickel welding or bus strip.

FIG. 13 shows a typical logic module. It includes a series of layers, the majority of which includes two diode logic gates. The detailed nature of the module structure will be explained in greater detail below. At the present time, it is sufficient to note that a series of nickel bus strips 142 are employed and that there are two such strips of the type described above between each row of components. The insulating strips 144 separate each pair of adjacent bus strips 142. It may also be noted that the array of FIG. 13 is more regular than that of FIG. 3. This difference arises from the fact that logic circuits characteristically include only diodes and resistors, whereas active modules normally include other components such as capacitors and transistors.

The riser wires 146 extend from the module of FIG. 13 and are interconnected with other modules forming the data processing system 148. The bistable multivibrator which also appears in FIG. 13 is part of one of the other modules. The "0" output of the bistable multibrator 150 is connected to one of the riser wires 152, and the "1" output of multivibrator 150 is connected to the corresponding riser wire 154 which is located directly behind and opposite riser wire 152 on the other side of the module. One of the output leads of the multivibrator 150 will always be deenergized when the other one is energized. For reasons which will be discussed in detail later, it is advantageous to connect these two output leads to a pair of aligned riser wires.

Figure 14:
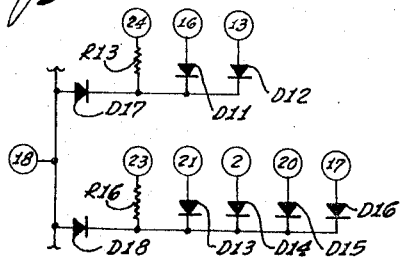
FIG. 14 is a circuit diagram of an electrical circuit included in one of the sandwich layers forming part of the module of FIG. 13.

Detailed consideration will now be given to two of the sandwiched layers which are shown in FIG. 13. The layer 156 of FIG. 13 includes the circuit elements shown in FIG. 14. Thus, it includes an AND gate formed of the diodes D11 and D12 in combination with the resistor R13. An AND gate, by definition, is a circuit which produces an output signal only when all of its input leads are energized. For convenience, the riser wires to which the various diodes are connected are shown in circles in FIG. 14. A second AND gate shown in FIG. 14 includes four diodes D13 through D16 and the resistor R16. The common output of the diodes D11 and D12 is connected to one of the two bus strips bracketing layer 156, while the output from the AND gate made up of diodes D13 through D16 is connected to the other ladder. The two AND gates noted above are coupled through an OR gate, formed by diodes D17 and D18 to the riser wire 18. An OR gate, by definition, is a circuit which produces an output signal when any number of its input leads are energized.

Figure 15:
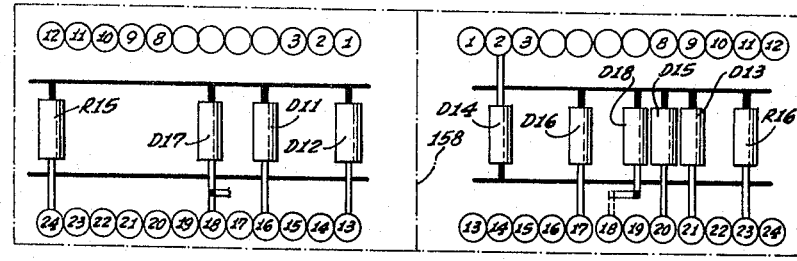
FIG. 15 is a diagram indicating how the two gates included in the circuit of FIG. 14 are combined to form a single modular layer.

The physical orientation of the subassemblies forming each of the two AND gates, and their associated OR diodes, is shown in FIG. 15. FIG. 15 also shows the relationship of the subassemblies as secured to the ladders, with respect to the riser wire positions. In FIG. 15 these riser wire positions are shown by the encircled numbers designated 1 through 24. The right-hand side of FIG. 15 shows the lower AND gate including resistor R16 and diodes D13 through D16 and the associated OR gate diode D18. The left-hand side of FIG. 15 shows the upper AND gate of FIG. 14 including diodes D11, D12 and R15, and the associated OR gate diode D17.

FIG. 15 represents layer 156 of FIG. 13 unfolded so that the two nickel strips together with the components associated with each strip, are shown individually. In considering FIG. 15, the dash-dot line 158 may be considered to be located to the right of the end of layer 156 in FIG. 13, and the upper bus strip and its associated components may be throught of as rotated about line 158, as the sandwich forming layer 156 is unfolded. Thus, with respect to layer 156 in FIG. 13, the resistor R16 is actually located adjacent resistor R15 at the left-hand end of the layer. Similarly, comparing FIGS. 15 and 13, diode D12 is located at the right-hand end of layer 156 adjacent diode D14. It is evident, therefore, that there is no conflict between the component positions of the two gates which are included in layer 156.

Figure 16:
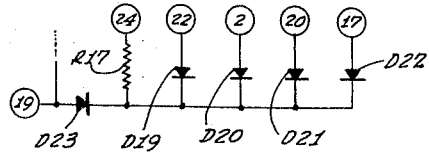
FIGS. 16 and 17 are circuit diagrams of two logic gates included in another sandwich layer of FIG. 13.
Figure 17:
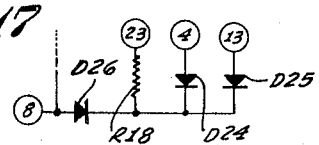
Figure 18:
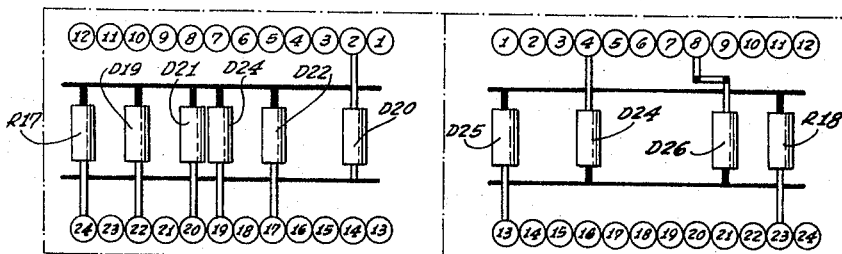
FIG. 18 is a diagram indicating how the logic circuits of FIGS. 16 and 17 are combined structurally to form one of the layers included in the module of FIG. 13.

In a similar manner, layer 160, the lowermost layer of FIG. 13, is made up of two AND gates which are shown in FIGS. 16 and 17, and the relative positions of the included components are shown in FIG. 18. The manner of location of the components and the operation of the circuit is identical with that which has been explained in detail in connection with FIGS. 14 and 15. The correspondence between the part numbers and the positions in the drawing indicate the exact arrangement of the components.

It is evident from the foregoing discussion that logic circuits may be arranged in modular form by interconnecting riser wires and a bus strip with a series of diodes and resistors. The physical location of the diode is normally determined by the location of the riser wire with which it is to be connected. It is also evident, for purposes of high component packing densities and simplicity of interconnections, that the same component space should be allocable to only one component. As mentioned above, any particular logic circuit will normally not require, as inputs, both of the "paired" output signals from a multivibrator. Thus, if an AND gate has, as one input, the "0" output from a bistable multivibrator, such as the circuit 150 of FIG. 13, it will not also have as an input the "1" output of the multivibrator. Therefore, if the two outputs of the multivibrator are connected to opposed riser wires in the front and the back of the modules, the component space in any given layer will be available for connection to one or the other of these two multivibrator outputs but not for both of them; accordingly, this type of arrangement of the multivibrator output signals, in aligned riser wire positions, on opposite sides of the module, make for higher packing densities in logic circuit modules. Paired output signals from sources other than multivibrators are advantageously connected to the logic modules in the same manner.

In FIG. 13, the diode D11 is connected to the riser wire 152, representing the "0" output of the multivibrator 150. Similarly, the diode D24 is connected to the riser wire 154 (standardized riser wire position No. 4), which is, in turn, connected to the "1" output of the bistable multivibrator 150. The connections to the two outputs of the multivibrator 150 in different logic circuits indicates the diode interconnections with opposed riser wires forming the outputs of a multivibrator as discussed in some detail in the preceding paragraph. While only one such multivibrator connection to a pair of riser wires is shown in FIG. 13, other comparable circuits included in the data processing circuit 148 may also be connected to corresponding opposed pairs of the riser wires 146.

Figure 19:
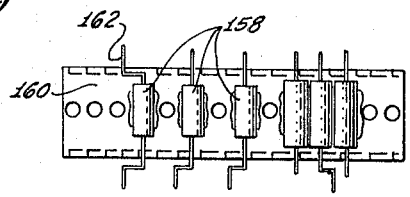
FIG. 19 shows a single layer including a conducting bus strip to which electrical components are secured.

The method of construction of the modules discussed above will now be considered. Initially, the individual layers are prepared as shown in FIG. 19. As the layers are stacked together as shown in FIG. 20, proper layer spacing is maintained by the beads 168 which are threaded on the assembly rods 164 and 166. The main supporting frame member 170 is provided with a series of central holes 172 in which rods 164 and 166 may be selectively located to provide the desired module width. In addition, at the outer edges of the frame member 170, there are a series of smaller holes 174 through which riser wires may subsequently be inserted.

FIG. 21 shows a module in which the electrical connections have been completed. Thus, the riser wires 176 have been inserted through the openings in the frame member and secured to appropriate connections at the various layers. In addition, the riser wires have been clipped where necessary to make the desired electrical connections and avoid undesired short circuits. The next step following the showing of FIG. 20 is to remove the frame members and encapsulate the unit. The completed module is shown in FIG. 22. The riser wires 176 may be observed extending from the encapsulated unit. In addition, the U-shaped channel 178 of metal, preferably aluminum, and the encapsulating material 180 are clearly shown in FIG. 22.

At this point, it is useful to mention the unique thermal properties of the present electronic modules. These properties are achieved through the use of the bus strips of metal which are associated with each standardized layer of the assembly. These strips, in combination with the standardized wiring interconnections, provide high heat flow capacity with readily predictable thermal properties. The heat flow from the electrical components, through the bus strips and other electrical connections to the aluminum channel 178 which forms the outer wall of the encapsulated module may be easily predicted, when considered in combination with the heat dissipation figures of the electrical components. In connection with the thermal predictability of the modular units, it is noted that the encapsulating material which may be employed can be selected to fill the heat dissipation requirements. Thus, for example, where predictions indicate that low thermal conductivity material is adequate, a relatively light foam type encapsulating material, such as polyurethane foam, may be used. However, where high thermal conductivity properties are required in view of the high heat dissipation in a particular module, a filled epoxy may be employed. Thus, weight may be reduced when heat dissipation is not a critical factor. This capability of the present modules is particularly important for airborne applications, or the like, where weight is often a critical factor.

In the foregoing description, the individual layers shown, for example, in FIGS. 6 through 11 have included components mounted on a bus strip. The bus strip was perforated in these embodiments and included preformed bendable tabs for connection to the individual component leads. The layers also include leads for completing the connections between components. As mentioned above, the bus strip could also take the form of two or more parallel wires interconnected by cross wires to form a true ladder-like array. One such arrangement is shown in FIG. 23 of the drawings. In this figure, the layers include a pressure sensitive tape 202 having its adhesive surface facing upward. Mounted on this surface are a row of electronic components 204. These electronic components are secured to the pressure sensitive tape both by means of the adhesive surface of the tape and through electrical and mechanical connections to one or more of the sets of nickel wires 206 and 208 which extend along the pressure sensitive tape at the sides of the electrical components 204. The innermost of the nickel wires 206, 208 may be secured together by suitable crossbridging wires 210 and 212 to form a bus strip.

Electrical connections may be made between the electrical components through the wires 206, 208. Thus, for example, the two end components have their leads 214 and 216, respectively, connected together by bent portions 218 and 220, respectively, of one of the nickel wires. The nickel wires are bent out of their normal linear orientation to engage the desired components and the resultant V-shaped bends are welded to the leads from the individual components. In order to avoid undesired short circuits, the wire may be bent out of its normal position and the V-shaped bent portion of the wire may be clipped. Typical breaks of this type are shown at 222. Virtually any desired pattern of interconnection may be made by this arrangement. The connections from the various wires to the leads correspond in function both to the connections formed by tabs from the nickel strips and also to the layer interconnections such as leads 139, 141 and 143, as shown in FIG. 10. The resultant layers may readily be assembled into a module interconnected by riser wires in the manner disclosed above and other forms of layer construction.

The arrangement of FIG. 23 has several advantages over layer constructions using the nickel strips described above. Thus, for example, the pressure sensitive tape may be much thinner than the nickel strip, resulting in a reduction in volume of the module of about ten percent. Furthermore, the tape and wires can be fed from spools, and the wires can be bent before they are pressed onto the tape, so that any desired pattern of connections can be made.

In considering the advantages of the present welded wire modules, the use of regularly spaced interconnection arrays for the electronic components should be stressed. Thus, as clearly shown in FIGS. 3 and 13, there is an inner set of regularly spaced "layer" connections which extend parallel to the ladders or nickel strips forming part of the modular layers. These layer connections serve to interconnect components within a given layer, and may be formed prior to assembly of the successive layers with one another. It may also be noted that the layer connections for all the layers are located generally in a plane at either end of the electronic components. When more complex layer interconnections are required, they may be located in two successive closely-spaced parallel planes, as noted above. The riser wires shown at 118 and 120 in FIGS. 3 and 5, respectively, and at 146 in FIG. 13, are located in a third plane, parallel to the layer interconnection planes. These riser wires are also regularly spaced and extend perpendicular to the layer interconnection wires. The two sets of cross-connections form a pair of interconnection arrays located on opposite sides of the module.

This systematic method of component interconnection has several advantages: first, it permits complete subassemblies to be made prior to the assembly of the layers with one another; this permits the utilization of relatively unskilled assembly workers. Secondly, the regular nature of the arrays will permit ultimate mechanization and automation of the welding interconnections. In addition, as noted above, the elapsed time from design to production may be greatly reduced, as no complex circuit boards or printed wiring need be produced.

It is to be understood that the above-described arrangements are illustrative of the application of the principles of the invention. Numerous other arrangements may be devised by those skilled in the art without departing from the spirit and scope of the invention. Thus, by way of example and not of limitation, the bus strips which are associated with layers in the module may take the form of pairs of straight wires having numerous cross-connections forming a structure which more closely represents an actual ladder; other circuits, in addition to the simple active coil-driving circuit and the simple logic module described above may be implemented by the present modular techniques; and other minor modifications of the structural and electrical interconnections of the module may also clearly be accomplished. Accordingly, from the foregoing remarks, it is to be understood that the present invention is to be limited only by the spirit and scope of the appended claims.

In the claims:

1. In an electrical circuit module having a length tailored to the complexity of the circuit, a plurality of parallel layers of electrical components, a series of elongated conducting bus strips having a width substantially greater than their thickness separating said layers, means for interconnecting some of the electrical components on said layers with the associated conducting bus strips, and means including a wiring array for interconnecting said components, said array including a set of regularly spaced layer interconnection wires extending parallel to said bus strips in a plane along one side of said module perpendicular to said components, and a set of regularly spaced riser wires extending perpendicular to said bus strips in another plane spaced outwardly from and generally parallel to the layer wiring plane, said bus strips and wiring array having adequate mechanical strength to provide self-sufficient mechanical interconnection of the components.

2. In an electrical module, a plurality of parallel layers of electrical components, a series of elongated conducting bus strips having a width substantially greater than their thickness separating said layers, means for connecting one terminal of a plurality of the same type of electrical components on one of said layers with the associated bus strip, means including two regular wiring arrays located on respectively opposite sides of said module for interconnecting said components, each of said arrays including a set of regularly spaced layer interconnection wires extending parallel to said conducting bus strips in a plane close to the ends of said electrical components and a set of regularly spaced riser wires extending perpendicular to said conducting bus strips in another plane spaced outwardly from said layer wiring plane, and means for connecting an active circuit having two different outputs to respective opposed riser wires on opposite sides of said module, one of said riser wires being connected to another terminal of one of said plurality of components.

3. In an electrical module, a plurality of parallel layers of electrical components, an elongated conductive bus element associated with each of said layers, each of said bus elements having an over-all width of conductive material several times greater than its thickness to facilitate electrical connection to the common point in an electrical circuit formed by said bus strip at either end of each of said components, means for interconnecting some of the electrical components on said layers with the associated conducting elements, and means including a wiring array for interconnecting said components, said array including a set of regularly spaced layer interconnection wires extending parallel to said conducting elements in a plane perpendicular to and close to the ends of the electrical components, and a set of regularly spaced riser wires extending perpendicular to said conducting elements in another plane spaced outwardly from and generally parallel to said layer wiring plane, said bus elements and said wires being of sufficient rigidity to independently hold said components in their proper relative positions.

4. In an electrical module a plurality of parallel layers of electrical components, a series of elongated conducting elements having a width substantially greater than their thickness separating said layers, means for interconnecting some of the electrical components on said layers with the associated conducting element, means including two regular wiring arrays located on respectively opposite sides of said module for interconnecting said components, each of said arrays including a set of regularly spaced layer interconnection wires extending parallel to said conducting elements in a first plane and a set of regularly spaced riser wires extending perpendicular to said conducting elements in another plane spaced outwardly from said first plane, a source of two binary electrical signals which are opposite in value, and means for connecting the two signals to respective opposed riser wires.

5. In a welded wire module, a plurality of successive modular layers mounted on top of each other, each including a bus strip having a width substantially greater than its thickness and a plurality of electrical components mounted on one side of said strip parallel to each other and perpendicular to the length of said strip, some of said components being welded to said strip, means for connecting selected components in a layer by leads extending parallel to said strips, and riser wires extending perpendicular to the planes of the strips to make connections with different layers, said riser wires being located adjacent the ends of the components in said layers, and extending beyond the modules to form terminals for the module, said bus strips, leads, and wires being of sufficient rigidity to independently hold said components in their proper relative positions.

6. In an electrical module, a plurality of parallel layers of electrical components, conductive bus elements having a width greater than their thickness associated with said layers, said bus element being generally coextensive with said layers, means for interconnecting some of the electrical components on said layers with the associated conducting elements, and means including a wiring array for interconnecting said components, said array including a set of regularly spaced layer interconnection wires extending parallel to said conducting elements in a plane at the ends of the elements, and a set of regularly spaced riser wires extending perpendicular to said conducting elements in another plane spaced outwardly from and generally parallel to said layer wiring plane.

7. In a welded wire module, a plurality of successive sandwiched layers mounted on top of each other, each including a pair of conductive bus strips having a width greater than their thickness and a plurality of electrical components mounted between said strips, some of said components being welded to each of said strips.

8. In a welded wire logic module, a plurality of successive sandwiched layers mounted on top of each other, each including a pair of conductive bus strips having a width greater than their thickness and a plurality of electrical components including diodes mounted between said strips, at least two diodes included among said components being connected to each of said strips.

9. In a logic module, a plurality of successive layers mounted on top of each other, each layer including a conductive bus strip, a plurality of electrical components including diodes mounted between adjacent strips, each of said bus strips having an over-all width of electrically conductive material several times greater than its thickness to facilitate electrical connection to a common point in the electrical circuit at either end of each of said components, at least two diodes included among said components welded to an adjacent conductive strip.

10. In a welded wire logic module, a plurality of successive sandwiched layers mounted on top of each other, each including a pair of strips of conductive material having a width greater than their thickness, a plurality of electrical components including diodes mounted between said strips, at least two diodes in one of said layers being welded to one of said strips, at least two additional diodes in the same one of said layers being welded to the other of said conductive strips.

11. In an electrical module, a plurality of parallel layers of electrical components, an elongated conductive bus element having a width greater than its thickness associated with each of said layers, means for interconnecting some of the electrical components on said layers with the associated conducting elements, and means including a wiring array for interconnecting said components, said array including two sets of regularly spaced layer interconnection wires extending parallel to said conducting elements in spaced adjacent planes perpendicular to and close to the ends of the electrical components, and a set of regularly spaced riser wires extending perpendicular to said conducting elements in another plane spaced outwardly from and generally parallel to said layer wiring planes.

12. A welded wire module comprising a series of layers of electronic components, elongated bus strips having a width greater than their thickness mounted between said layers, and means for welding said bus strips to the terminals of selected adjacent components.

13. A module as defined in claim 12 wherein said bus strips are made up of pairs of wires at the ends of said electronic components and interconnection wires extending parallel to the electronic components and interconnecting each pair of wires.

14. A welded wire modular circuit comprising a plurality of layers of parallel electrical components, elongated bus strips mounted between said layers and extending perpendicular to said electrical components, said bus strips having an over-all width of conductively connected material several times greater than their thickness to facilitate electrical connection to a common point in the electrical circuit at either end of each of said components, and means for welding said bus strips to the terminals of selected components adjacent said strips.

15. In an electrical module, a plurality of parallel layers of electrical components including some diodes, a series of elongated conducting bus strips separating said layers, said bus strips having a width of conductively connected material greater than their thickness, means for connecting one terminal of a plurality of said diodes on one of said layers with the associated bus strip to form a diode gate, means including two regular wiring arrays located on respectively opposite sides of said module for interconnecting said components, each of said arrays including a set of regularly spaced layer interconnection wires extending parallel to said conducting bus strips in a plane close to the ends of said electrical components and a set of regularly spaced riser wires extending perpendicular to said conducting bus strips in another plane spaced outwardly from said layer wiring plane, and means for connecting an active circuit having two different outputs to respective opposed riser wires on opposite sides of said module, one of said riser wires being connected to another terminal of one of said diodes.

References Cited by the Examiner

UNITED STATES PATENTS

| | | | |
|---|---|---|---|
| 2,816,253 | 12/1957 | Blitz | 317—101 |
| 2,851,219 | 9/1958 | Hussey | 307—88 |
| 2,874,313 | 2/1959 | Githens | 307—88 |
| 2,911,572 | 11/1959 | Francis et al. | 29—155 X |
| 2,977,672 | 4/1961 | Telfer | 174—68 X |
| 2,985,709 | 5/1961 | Mammola | 174—68 |
| 3,098,951 | 7/1963 | Aver et al. | |
| 3,151,278 | 9/1964 | Elarde | 174—68 X |
| 3,157,828 | 11/1964 | Flaherty | 29—155 X |
| 3,162,788 | 12/1964 | Allen et al. | 317—101 |
| 3,177,405 | 4/1965 | Gray | 317—101 |
| 3,179,854 | 4/1965 | Luedicke et al. | 317—101 |

ROBERT K. SCHAEFER, *Primary Examiner.*

J. P. WILDMAN, J. F. BURNS, K. H. CLAFFY, R. S. MACON, *Examiners.*

D. CLAY, J. G. COBB, W. C. GARVERT,
*Assistant Examiners.*